June 4, 1963 W. FLIEG ETAL 3,092,310

DATA PROCESSING APPARATUS

Filed Aug. 10, 1961 4 Sheets-Sheet 1

INVENTORS
WERNER FLIEG
STANLEY FRANCIS PLAISANCE
BY

ALAN K. ROBERTS
ATTORNEY

INVENTORS
WERNER FLIEG
STANLEY FRANCIS PLAISANCE
BY

ALAN K. ROBERTS
ATTORNEY

INVENTORS
WERNER FLIEG
STANLEY FRANCIS PLAISANCE
BY
ALAN K. ROBERTS
ATTORNEY

June 4, 1963 W. FLIEG ETAL 3,092,310

DATA PROCESSING APPARATUS

Filed Aug. 10, 1961 4 Sheets-Sheet 4

INVENTORS
WERNER FLIEG
STANLEY FRANCIS PLAISANCE
BY

ALAN K. ROBERTS
ATTORNEY

United States Patent Office 3,092,310
Patented June 4, 1963

3,092,310
DATA PROCESSING APPARATUS

Werner Flieg, Brookline, and Stanley Francis Plaisance, Newton Center, Mass., assignors to Invac Corporation, Waltham, Mass.

Filed Aug. 10, 1961, Ser. No. 130,547
13 Claims. (Cl. 234—52)

This invention relates to data processing equipment and more particularly to data recording apparatus.

It is an object of the invention to provide improved data recording apparatus.

A further object of the invention is to provide improved keyboards for recording data on record media such as paper tapes and the like.

Yet another object of the invention is to provide an improved keyboard construction wherein provision is made for assuring the transmission of valid data.

Still a further object of the invention is to provide an electromechanical data sampling technique which insures against errors.

In achieving the above and other of its objectives, there is contemplated in accordance with the invention the provision of means, which are actuated by a manual operation such as a typing operation, to provide mechanical forces which assure that the manual operation is brought to a predetermined termination point and that mechanical functions to be effected as a result of the manual operation are performed precisely. Said means further provide for the proper sampling of data or information signals and the transmission of the properly sampled signals to a data recording apparatus such as a tape punch or the like.

According to one feature of the invention, provision is made for engaging the key levers of a keyboard during the movement thereof in response to a manually applied force in order to assume the movement of said key levers to predetermined terminal positions of movement. Furthermore, provision is made for maintaining the key levers in position while certain auxiliary functions are performed with respect to the encoding of data.

Another object of the invention relates to a unique technique for generating an information sampling signal in response to the controlling of movements of key levers and the like.

According to still another feature of the invention, keyboards provided in accordance therewith may be internally or externally controlled.

Still further, the invention contemplates the provision of apparatus having a unique touch response so that the keyboard operator may readily detect when an operation has resulted in the proper entry of data.

Advantageously, apparatus of the invention is uniquely adapted for prolonged life with a minimum of maintenance.

Further, apparatus of the invention is susceptible of being manufactured at low cost while incorporating all of the conventional features available in more expensive apparatus, as well as features not available in conventional apparatus.

The above objects, features and advantages of the invention will become apparent from the following detailed description of a preferred embodiment of the invention as illustrated in the accompanying drawing in which.

Figure 1:
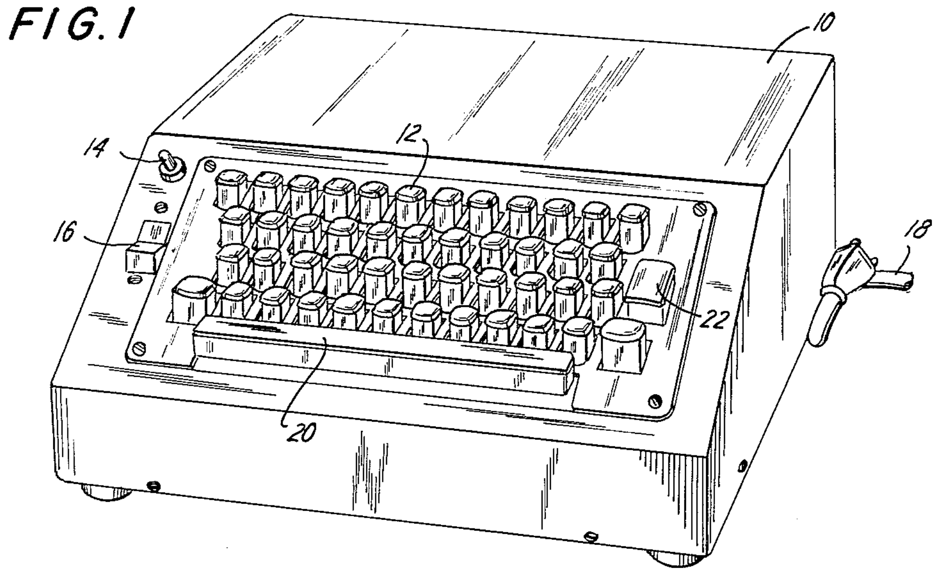
FIGURE 1 is a pictorial view of an alpha-numeric keyboard provided in accordance with the invention.

The alpha-numeric keyboard illustrated in FIG. 1 comprises generally a casing or frame 10, a plurality of keys 12, a pilot light 14, an off-on switch 16 and a power supply line 18. Included among the key operated devices is a spacer bar 20 and a return key 22. It will be understood in the description which follows that the operation of such elements as members 20 and 22 will cause the recording on a record medium of a corresponding code group but that there is no corresponding typing operation as typing operations are not involved herein.

Figure 4:
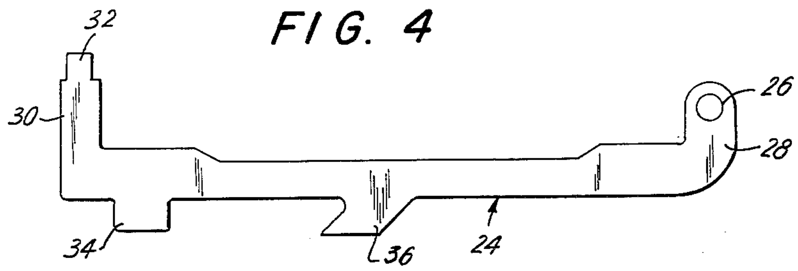
FIGURE 4 is a side view of a key lever employed in the aforesaid keyboard.
Figure 2:
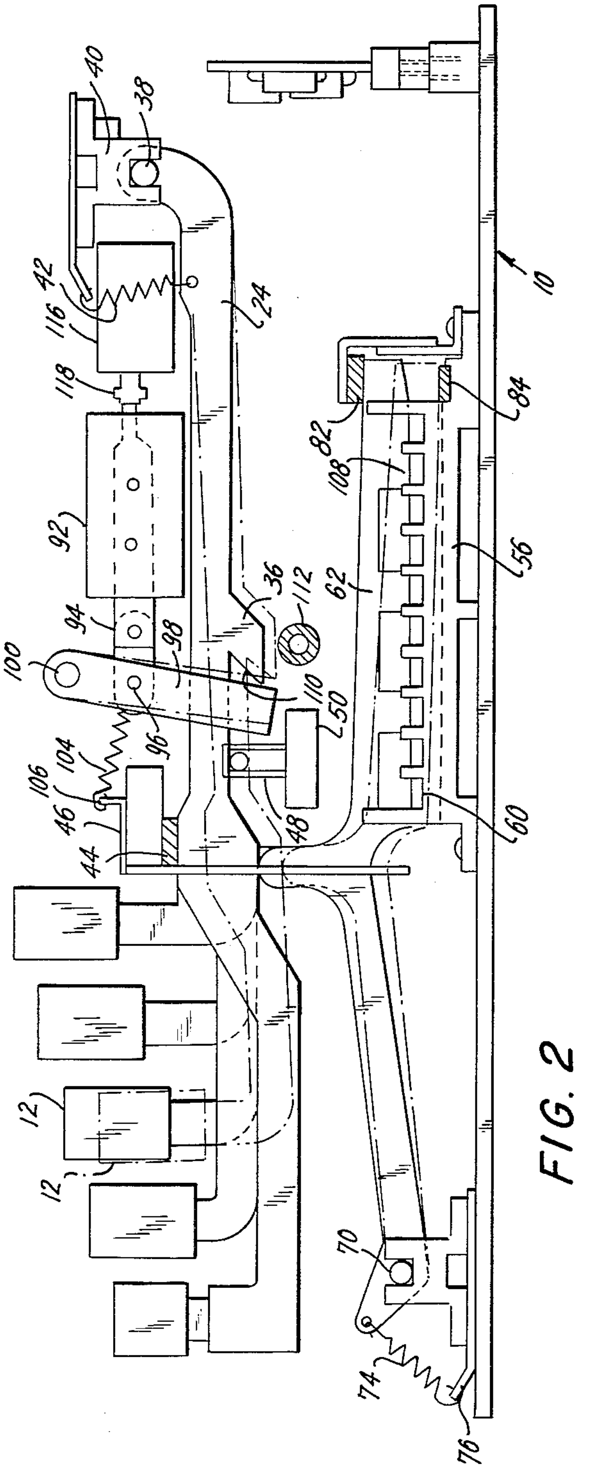
FIGURE 2 is a longitudinal section of the keyboard of FIG. 1 with the keys and some of the auxiliary elements removed.

Keys 12 are also seen in FIG. 2, wherein for each key is provided a key lever 24 (see also FIG. 4). Each key lever 24 is provided with an aperture 26 positioned in an end arm 28. At the other extremity of each key lever 24 is provided an upright extension 30 whereupon is located a terminal portion 32 upon which is accommodated the associated key. The length of each key lever 24 corresponds to the position of the associated key in the keyboard arrangement.

Also included in each key lever 24 is a downward extension 34 and an inclined latch member 36, the purpose of these sections being hereinafter made apparent.

Key levers 24 are mounted on a shaft 38 in a bracket 40 mounted on frame 10. Each lever 24 is spring loaded by a spring 42 and yieldably urged thereby to a normal position of rest against a resilient stop or abutment 44 mounted on a strip 46 supported on the frame 10.

The key levers 24 may, for example, be arranged in parallel for downward displacement along respective parallel paths, but may, as well have other arrangements such as in radial planes disposed about a common center.

Figure 5:
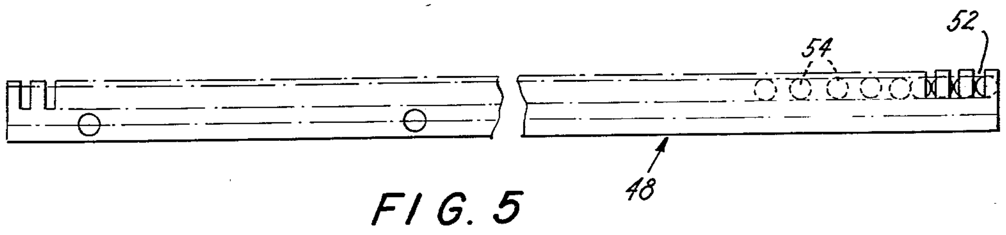
FIGURE 5 is a front view of an interlock device provided in association with the aforesaid key lever.

A key lever interlock device 48 is provided which is supported on a strip 50 affixed to the frame 10. The interlock device, which is also shown in FIG. 5, is a generally elongated member, the length of which exceeds the breadth of the alignment of key levers 24.

Interlock device 48 is provided with a plurality of slots 52 which are arranged to accommodate respective of the key levers 24. In an elongated channel or chamber provided within device 48 are accommodated a plurality of balls 54, the collective dimension of which is less than the overall length of the channel in device 48 by an amount corresponding to about the width of a single slot 52. This insures that only one key lever 24 may be entered into a slot 52 at a time so that simultaneous operation of two key levers 24 is prevented.

Figure 6:
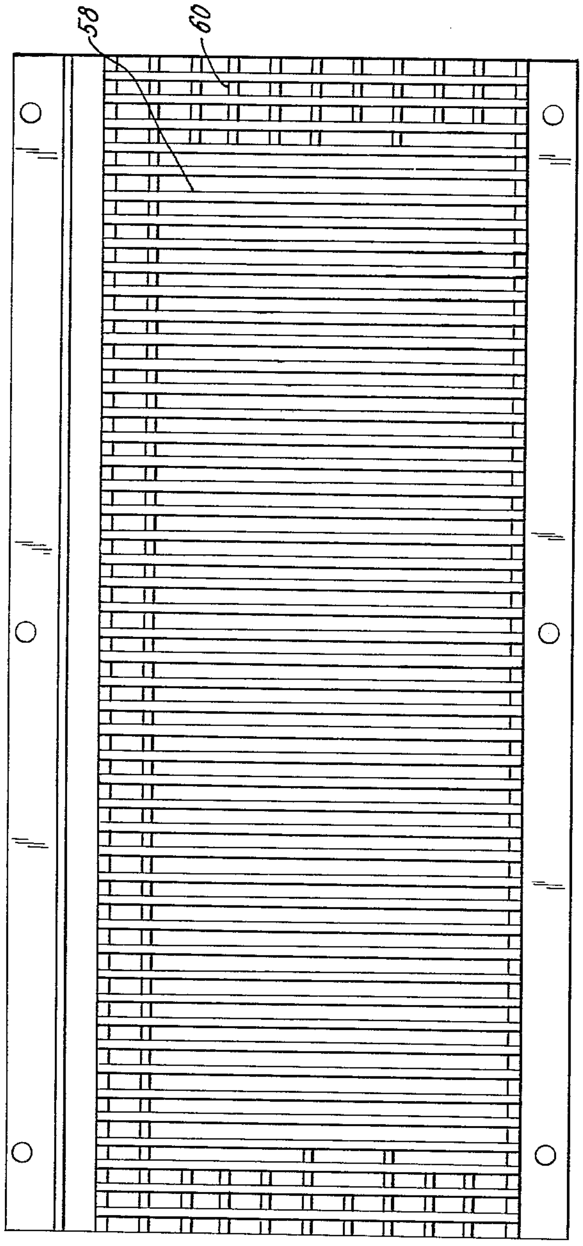
FIGURE 6 is a top plan view of an element of a coding arrangement employed in the keyboard of the invention.

Located on the bottom of frame or casing 10 is a channel member 56 (see also FIG. 6). Channel member 56 is in the nature of a flat plate on the upper surface of which is provided a first plurality of parallel channels 58 and a second plurality of parallel channels 60 which are perpendicular to the first said channels.

Channels 58 are equal in number to the slots 52 of FIG. 5 and the key levers 24 of FIGS. 2 and 4, and are adapted to receive shutter members 62, which will be hereinafter described in greater detail.

Figure 3:
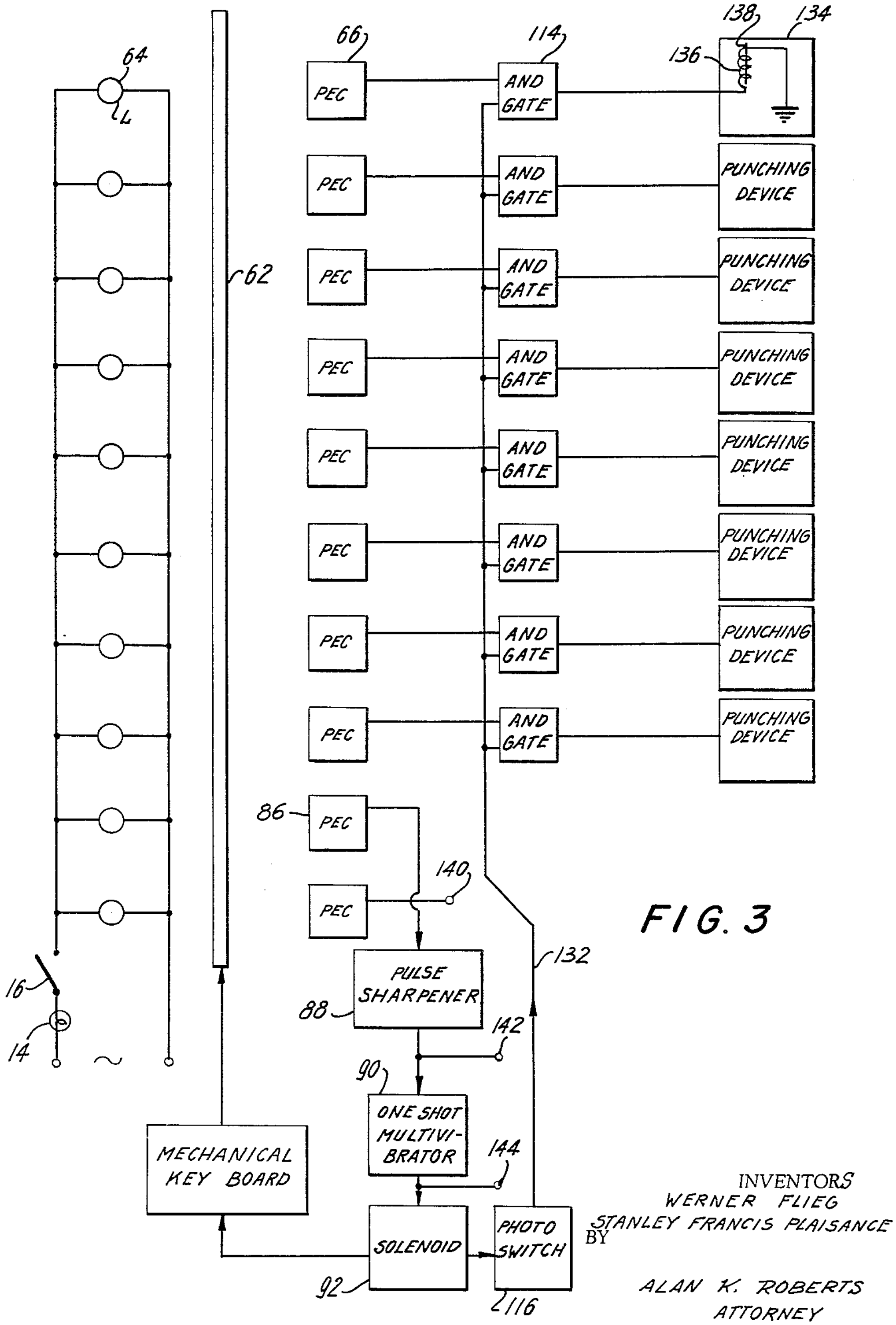
FIGURE 3 is a diagram of the keyboard of the invention and associated electric and electromechanical elements.

At one end of channel member 56 is provided one or more light sources 64 as diagrammatically illustrated in FIG. 3, whereas at the other end of channel member 56 is provided a plurality of separate photoelectric cells 66, there being provided one photoelectric cell for each of the light beams formed by channels 60 (see FIG. 6).

As implied above, there is a shutter 62 provided in association with each key lever 24 and therefore in association with each key 12.

Each shutter 62 is provided with an aperture 68 by means of which the shutter is pivotally mounted on a shaft 70. Moreover, each shutter is provided with a further aperture 72 by means of which each shutter is spring loaded by a spring 74 connected to a bracket 76 supported on the casing 10.

Furthermore, each shutter is provided with an upwardly extending protrusion 78 by means of which the shutter is engaged by the superposed key lever 24. It is to be noted that each shutter is separate from the corresponding key lever 24, there being simply an abutting relationship therebetween when the associated key lever is depressed.

Each shutter 62 is provided with a plurality of sections 1–9, any or all of which can be cut out according to a predetermined code. Stated otherwise, coded combinations are provided in each of the shutters 62 in accordance with the item of information or character represented by the associated key 12. In addition, there is provided a strobe channel 80, the purpose of which will be hereinafter indicated even though the details thereof do not form a part of this invention.

In FIG. 2 it will be noted that the shutters are adapted for selectively extending into channels 60 in member 56 and as a result the shutters are adapted for selectively isolating the photoelectric cells 66 from the light source of source 64. This in known manner, conventionally operates to change the electrical state of said photoelectric cells to provide electrical signals.

Shutters 62 are yieldably maintained in a position of rest against a resilient pad 82 and are displaced therefrom in a direction of resilient pad 84 under the influence of the associated key levers 24.

It is not intended in accordance with the invention, however, that manual operation of keys 12 bring shutters 62 to their respective terminal positions against pad 84 directly. For in accordance with the invention, an auxiliary electromechanical arrangement is provided which assumes the function of so displacing the shutters.

More particularly, with reference to FIG. 3, it will be seen that one of the photoelectric cells such as, for example, photoelectric cell 86, is connected to a pulse sharpener 88 which in turn is connected to a one-shot multivibrator 90. One-shot multivibrator 90 is in turn connected to a solenoid or other such electromechanical device 92, which is also shown in FIG. 2.

Figure 7:
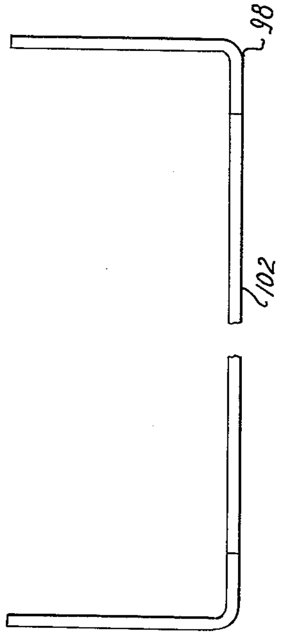
FIGURE 7 illustrates a further element employed in operative combination with the key levers of the aforesaid keyboard.

Solenoid 92 is provided with an armature 94 displaceable in conventional manner and pivotally connected by pin 96 to a pivotal member of U-shaped bracket 98, seen also in FIG. 7.

Actually, two solenoids 92 are provided, one at each extremity of bracket 98, but only one is shown and discussed for purposes of clarity.

Bracket 98 is pivotally supported by a shaft 100 extending transversely of said key levers 24. The lower extremity 102 of U-shaped bracket 98 extends beneath and along the key levers 24. The breadth of bracket 98 exceeds that of the array of key levers 24 so that engagement may be made with the latch members of each of the latter.

Bracket 98 is spring loaded by a spring 104 connected to a strip 106 fixed to casing 10. Thus, in FIG. 2, bracket 98 is yieldably urged in clockwise direction around shaft 100.

Operation of solenoid 92 acts through armature 94 to displace bracket 98 in counterclockwise direction around shaft 100 in opposition to the force of spring 104.

When a key lever 24 has been displaced by a predetermined fraction of its path of travel, it will cause the associated shutter 62 to commence isolating selected of the photoelectric cells 66 from the aforesaid light source. In a preferred embodiment of the invention, such an interruption of the light beam will always be effected in control channel 108.

This will cause a signal to be generated by photoelectric cell 86 which will be transferred via pulse sharpener 88 to one-shot multivibrator 90. One-shot multivibrator 90 is a conventionally designed circuit having a square wave output pulse, the duration of which is about 20 milliseconds. This output pulse operates solenoid 92.

Upon operation of solenoid 92, bracket 98 is swung into engagement with the latch member 36 of the associated key lever 24. The vector of movement of bracket 98 and the inclination of surface 110 of the latch member 36 is such that lever 24 is moved into terminal position against rubber cylinder 112, the corresponding shutter 62 also being moved to its terminal position. Shutter 62 remains locked in position until the expiration of the output pulse of one-shot multivibrator 90 so that a fixed period of time during which to sample the information signals which are concomitantly generated is assured.

At the same time as a signal is being generated in photoelectric cell 86, data or information signals are being generated in other of the photoelectric cells 66 according to the coded arrangement of apertures in the operated shutter 62. These information signals are transmitted to and-gates 114 which are of conventional design. And-gates 114 block these information signals until conditioned or primed to pass the same.

Figure 8:
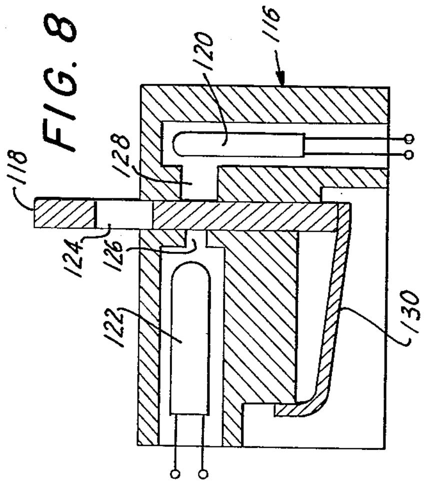
FIGURE 8 is a sectional view through a photoelectric switch employed in the apparatus of the invention.

To produce a priming signal, solenoid 92 is mechanically connected to photoswitch 116 (see FIGS. 2, 3 and 8). More particularly, the armature 94 of solenoid 92 is connected to the shutter 118 of photoswitch 116, the shutter therefore partaking of the movement of the solenoid's armature.

Internally of photoswitch 116 is accommodated a light source 120 and a photo-responsive device or cell 122 which are isolated from one another except when aperture 124 of shutter 118 is aligned with passageways 126 and 129. A spring 130 is provided by means of which shutter 118 is normally maintained in a position whereat cell 122 is isolated from light source 120.

Operation of photoswitch 116 causes a signal to be transmitted from photoelectric cell 122 via line 132 to gates 114 whereby information signals are transmitted to record medium marking devices 134.

Although many different types of record marking devices may be employed, there is diagrammatically illustrated in FIG. 3 a coil 36 controlling a punching pin 138, there being provided a series of pins 138 adapted for punching coded combinations of holes into a paper tape.

From what has been stated above, it will be obvious that operation of a shutter 62 selectively isolates photoelectric cells 66 from light source or sources 64 whereupon signals are fed to and-gates 114. At the same time, a signal generated in photoelectric cell 86 passes via pulse sharpener 88 and one-shot multivibrator 90 to solenoid 92.

Solenoid 92 performs two functions. Through the intermediary of bracket 98 it causes the associated key lever 24 and shutter 62 to move to terminal position and maintains said elements in this position. At the same time, with a tolerable delay of no more than about 6 milliseconds required to home the armature 94, the photoswitch 116 is operated to gate the information signals through gates 114 to operate punching devices 134.

Figure 9:
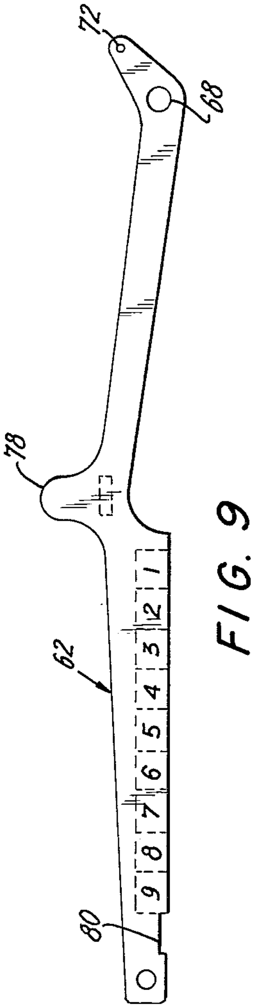
FIGURE 9 illustrates a shutter element employed in the keyboard of the invention.

As an alternative option, the strobe channel 80 (FIG. 9) may be employed to generate a delayed sampling signal which will appear, for example, at terminal 140. The signal at terminal 140 can as desired be applied to gates 114. The signal appearing at terminal 140 will be delayed inasmuch as channel 80 is recessed relative to the leading edge of each shutter.

Although a one-shot multivibrator 90 has been indicated, it is possible to omit this circuit and employ terminals 142 and 144 to which can be coupled an associated data processing apparatus from which a solenoid control channel may be tapped.

There will now be obvious to those skilled in the art many modifications and variations of the arrangements set forth above. These modifications and variations will not, however, depart from the scope of the invention if defined by the following claims.

What is claimed is:

1. In apparatus comprising means for generating a plurality of electrical signals: means displaceable to determinable positions relative to the first said means for selectively altering said signals, means for locking the second said means in said positions, the third said means being responsive to one of said signals for performng a locking operation for a determinable period of time, recording means, gating means adapted for connecting the first said means to said recording means for actuating the latter with selected of said signals, and means responsive to the actuation of the third said means for conditioning said gating means to pass said signals to said recording means.

2. Apparatus comprising means for generating a plurality of electrical signals, means displaceable to determinable positions relative to the first said means for selectively altering said signals, locking means for locking the second said means in said positions, said locking means being responsive to one of said signals for performing a locking operation for a determinable period of time, recording means, gating means adapted for connecting the first means to said recording means for actuating the latter with selected of said signals, and means responsive to the actuation of said locking means for conditioning said gating means to pass said signals to said recording means.

3. Apparatus comprising means for generating a plurality of electrical signals, means displaceable relative to the first said means for selectively altering said signals, electromechanical means for locking the second said means in positions to alter said signals, said electromechanical means being responsive to at least one of signals for performing a locking operationf or a determinable period of time, recording means, gating means adapted for connecting the first said means to said recording means for actuating the latter with selected of said signals, and means responsive to the actuation of said electromechanical means for conditioning said gating means to pass said signals to said recording means.

4. Apparatus comprising a plurality of keys, each key corresponding to an item of information to be recorded, levers respectively coupled to said keys, means pivotally supporting said levers, shutters operatively disposed beneath said levers and adapted to be engaged thereby, means supporting said shutters for displacement along parallel paths, a channel member beneath said shutters, said channel member defining a first plurality of parallel channels parallel to and adapted for accommodating respective of said shutters and a second plurality of parallel channels perpendicular to the first said channels, a light source at one end of the second said channels, and respectively corresponding thereto, said shutters being respectively provided with coded arrangements of openings at least in part corresponding to a code for the items of information related to corresponding of said keys whereby on displacement of the shutters into the second said channels selected of said photoelectric cells are isolated from said light source, record medium marking means coupled to those of said photoelectric cells corresponding to openings in the shutters adapted for representing information, latching means on said key levers, pivoted means adapted to engage the latching means of an actuated key lever and through the latter said key lever to maintain the associated shutter in predetermined position in the corresponding one of the second said channels, spring means engaging said pivotal means and urging the same to a normal inoperative position, solenoid means engaging said pivotal means for urging the latter into a position for engagement with said latching means, and means for driving said solenoid means and coupled to at least one of said photoelectric cells and being actuated thereby to actuate said solenoid means for a determinable period of time.

5. Data processing apparatus comprising a plurality of keys operatively associated in keyboard arrangement, each key corresponding to an item of information to be recorded, a plurality of levers respectively coupled to and supporting said keys, means pivotally supporting said levers, a key lever abutment, spring means coupled to said levers and maintaining the same normally against said abutment in a position of rest, said levers being displaceable from said abutment in opposition to said spring means, shutters operatively disposed beneath said levers and adapted to be engaged thereby upon displacement of said levers, means pivotally supporting said shutters for displacement along parallel paths, a shutter stop, spring means urging said shutters against said stop to a normal position of rest, a channel member beneath said shutters, said channel member defining a first plurality of parallel channels parallel to and adapted for accommodating respective of said shutters and a second plurality of parallel channels perpendicular to the first said channels, a light source at one end of the second said channels, photoelectric cells at the opposite ends of the second said channels and respectively corresponding thereto, said shutters being respectively provided with coded arrangements of openings at least in part corresponding to a code for the items of information related to corresponding of said keys whereby on displacement of the shutters into the second said channels selected of said photoelectric cells are isolated from said light source, record medium marking means coupled to those of said photoelectric cells corresponding to openings in the shutters adapted for representing information, latching means on said key levers, pivoted means adapted to engage the latching means of an actuated key lever and through the latter said key lever to maintain the associated shutter in predetermined position in the corresponding one of the second said channels, spring means engaging said pivotal means and urging the same to a normal inoperative position, solenoid means engaging said pivotal means for urging the latter into a position for engagement with said latching means, means for driving said solenoid means and coupled to at least one of said photoelectric cells and being actuated thereby to actuate said solenoid means for a determinable period of time, gating means interposed between the photoelectric cells adapted for encoding information and said record medium marking means, and a photoelectric switch connected to the solenoid means and said gating means and actuated by the solenoid means to condition said gating means to couple the latter said photoelectric cells to said record medium marking means for the recording of information on a record medium.

6. Data processing apparatus comprising a plurality of keys operatively associated in keyboard arrangement, each key corresponding to an item of information to be recorded, a plurality of levers respectively coupled to and supporting said keys, means pivotally supporting said levers, a key lever abutment, spring means coupled to said levers and maintaining the same normally against said abutment in a position of rest, said levers being displaceable from said abutment in opposition to said spring means, shutters operatively disposed beneath said levers and adapted to be engaged thereby upon displacement of said levers, means pivotally supporting said shutters for displacement along parallel paths, a shutter stop, spring means urging said shutters against said stop to a normal position of rest, an interlock device extending transversely of said levers and provided with slots to accommodate and guide said levers on actuation thereof, said device being provided with an elongated chamber communicating with said slots and of predetermined length, a plurality of balls in said chamber having a collective effective dimension which is less than said predetermined length by an amount substantially equal to the width of a slot whereby only one said slot can accommodate a key lever at a time, a channel member beneath said shutters, said channel member defining a first plurality of parallel channels parallel to and adapted for accommodating respective of said shutters and a second plurality of parallel channels perpendicular to the first said channels, a light source at one end of the second said channels, photoelectric cells at the opposite ends of the second said channels and respectively corresponding thereto, said shutters being respectively provided with coded arrangements of openings at least in part corresponding to the code for the items of information related to corresponding of said keys whereby on displacement of the shutters into the second said channels selected of said photoelectric cells are isolated from said light source, record medium marking means coupled to those of said photoelectric cells corresponding to openings in the shutters adapted for representing information, latching means on said key levers, pivoted means adapted to engage the latching means of an actuated key lever and through the latter said key lever to maintain the associated shutter in predetermined position in the corresponding one of the second said channels, spring means engaging said pivotal means and urging the same to a normal inoperative position, solenoid means engaging said pivotal means for urging the latter into a position for engagement with said latching means, means for driving said solenoid means and coupled to at least one of said photoelectric cells and being actuated thereby to actuate said solenoid means for a determinable period of time, gating means interposed between the photoelectric cells adapted for encoding information and said record medium marking means, and a photoelectric switch connected to the solenoid means and said gating means and actuated by the solenoid means to condition said gating means to couple the latter said photoelectric cells to said record medium marking means for the recording of information on a record medium.

7. In data processing apparatus including data recording means, a plurality of photoelectric cells, a light source operatively disposed with respect to said cells, shutters adapted for selectively isolating said cells from said source according to a predetermined code, and key levers manually operable to actuate said shutters, the combination comprising: extensions on said key levers and displaceable with the latter to respective determinable positions, first means for engaging said extensions and displacing the same and the associated key levers and shutters, second means for engaging said first means to displace the same to an active position for engaging extensions in said determinable positions, a further photoelectric cell operatively disposed relative to said light source and adapted for being isolated therefrom by said shutters, third means coupled to and actuated by said further photoelectric cell upon isolation of the latter from said light source, said third means being coupled to and actuating said second means whereby said first means is actuated, gating means adapted, upon being conditioned, for coupling the first said photoelectric cells to said recording means for controlling the latter, an auxiliary photoelectric cell, an auxiliary source operatively associated with said auxiliary cell, said auxiliary cell being connected to said gating means for conditioning the same, and an auxiliary shutter adapted to isolate said auxiliary cell and source for conditioning said gating means, the latter said shutter being connected to and actuated by said second means.

8. In data processing apparatus including data recording means, a plurality of photoelectric cells, a light source operatively disposed with respect to said cells, shutters adapted for selectively isolating said cells from said source according to a predetermined code, and key levers manually operable to actuate said shutters, the combination comprising: extensions on said key levers and displaceable with the latter to respective determinable positions, a U-shaped bracket, means pivotally supporting said bracket so that engagement can be made with an extension which is displaced to the corresponding determinable position, said extensions having surfaces inclined relative to said bracket and said bracket having a movement vector such that engagement of an extension by said bracket displaces said extension and the associated key lever and therefore the associated shutter, a bracket stop, a spring engaging said bracket and urging the same to inactive position against said stop, a solenoid engaging said bracket to displace the same to an active position for engaging extensions in said determinable positions, a further photoelectric cell operatively disposed relative to said light source and adapted for being isolated therefrom by said shutters, a one-shot multivibrator coupled to and actuated by said further photoelectric cell upon isolation of the latter from said light source, said one-shot multivibrator being coupled to and actuating said solenoid whereby said bracket is actuated, gating means adapted, upon being conditioned, for coupling the first said photoelectric cells to said recording means for controlling the latter, and a switch connected to said gating means for conditioning the same, said switch being connected to and actuated by said solenoid.

9. In data processing apparatus including data recording means, a plurality of photoelectric cells, a light source operatively disposed with respect to said cells, shutters adapted for selectively isolating said cells from said source according to a predetermined code, and key levers manually operable to actuate said shutters, the combination comprising: extensions on said key levers and displaceable with the latter to respective determinable positions, a bracket, a pivot pivotally supporting said bracket so that engagement can be made with an extension which is displaced to the corresponding determinable position, said bracket having a movement such that engagement of an extension by said bracket further displaces said extension and the associated key lever and shutter, first means engaging said bracket to displace the same to an active position for engaging extensions in said determinable positions, a further photoelectric cell operatively disposed relative to said light source and adapted for being isolated therefrom by said shutters, second means coupled to and actuated by said further photoelectric cell upon isolation of the latter from said light source, said second means being coupled to and actuating said first means whereby said bracket is actuated, gating means adapted, upon being conditioned, for coupling the first said photoelectric cells to said recording means for controlling the latter, an auxiliary photoelectric cell, an auxiliary light source operatively associated with said auxiliary cell, said auxiliary cell being connected to said gating means for conditioning the same, and an auxiliary shutter adapted to isolate said auxiliary cell and source for conditioning said gating means, the latter said shutter being connected to and actuated by said first means with said bracket in engagement with one of said extensions.

10. In data processing apparatus including data recording means, a plurality of photoelectric cells, a light source operatively disposed with respect to said cells, shutters adapted for selectively isolating said cells from said source according to a predetermined code, and key levers manually operable to actuate said shutters, the combination comprising: extensions on said key levers and displaceable with the latter to respective determinable positions, a bracket, a pivot pivotally supporting said bracket so that engagement can be made with an extension which is displaced to the corresponding determinable position, said bracket having a movement vector such that engagement of an extension by said bracket further displaces said extension and also the associated key lever and shutter, a solenoid engaging said bracket to displace the same to an active position for engaging extensions in said determinable positions, a further photoelectric cell operatively disposed relative to said light source and adapted for being isolated therefrom by said shutters, means coupled to and actuated by said further photoelectric cell upon isolation of the latter from said light source, said means being coupled to and actuating said solenoid whereby said bracket is actuated, gating means adapted, upon being conditioned, for coupling the first said photoelectric cells to said recording means for controlling the latter, an auxiliary photoelectric cell, an auxiliary light source operatively associated with said auxiliary cell, said auxiliary cell being connected to said gating means for conditioning the same, and an auxiliary shutter adapted to isolate said auxiliary cell and source for conditioning said gating means, the latter said shutter being connected to and actuated by said solenoid.

11. In data processing apparatus including data recording means, a plurality of photoelectric cells, a light source operatively disposed with respect to said cells, shutters adapted for selectively isolating said cells from said source according to a predetermined code, key levers manually operable to actuate said shutters, and a key lever stop, the combination comprising: extensions on said key levers and displaceable with the latter to respective determinable positions, a bracket, means pivotally supporting said bracket so that engagement can be made with an extension which is displaced to the corresponding determinable position, said extensions having surfaces inclined relative to said bracket and said bracket having a movement vector such that engagement by said bracket displaces said extension until the associated key lever abuts the key lever stop, a solenoid engaging said bracket to displace the same to an active position for engaging said extensions, a further photoelectric cell operatively disposed relative to said light source and adapted for being isolated therefrom by said shutters, a one-shot multivibrator coupled to and actuated by said further photoelectric cell upon isolation of the latter from said light source, said one-shot multivibrator being coupled to and actuating said solenoid whereby said bracket is actuated, gating means adapted, upon being conditioned, for coupling the first said photoelectric cells to said recording means for controlling the latter, an auxiliary photoelectric cell, an auxiliary light source operatively associated with said auxiliary cell, said auxiliary cell being connected to said gating means for conditioning the same, and an auxiliary shutter adapted to isolate said auxiliary cell and source for conditioning said gating means, said shutter being connected to and actuated by said solenoid.

12. In data processing apparatus including data recording means, a plurality of photoelectric cells, a light source operatively disposed with respect to said cells, shutters adapted for selectively isolating said cells from said source according to a predetermined code, and key levers manually operable to actuate said shutters, the combination comprising: extensions on said key levers and displaceable with the latter to respective determinable positions, a bracket, means pivotally supporting said bracket so that engagement can be made with an extension which is displaced to the corresponding determinable position, said extensions having surfaces inclined relative to said bracket and said bracket having a movement vector such that engagement of an extension by said bracket displaces said extension and the associated key lever and therefore the associated shutter, a solenoid engaging said bracket to displace the same to an active position for engaging extensions in said determinable positions, a further photoelectric cell operatively disposed relative to said light source and adapted for being isolated therefrom by said shutters, a one-shot multivibrator coupled to and actuated by said further photoelectric cell upon isolation of the latter from said light source, said one-hot multivibrator being coupled to and actuating said solenoid whereby said bracket is actuated, gating means adapted, upon being conditioned, for coupling the first said photoelectric cells to said recording means for controlling the latter, an auxiliary photoelectric cell, an auxiliary light source operatively associated with said auxiliary cell, said auxiliary cell being connected to said gating means for conditioning the same, and an auxiliary shutter adapted to isolate said auxiliary cell and source for conditioning said gating means, the latter said shutter being connected to and actuated by said solenoid.

13. In data processing apparatus including data recording means, a plurality of photoelectric cells, a light source operatively disposed with respect to said cells, shutters adapted for selectively isolating said cells from said source according to a predetermined code, and key levers manually operable to actuate said shutters, the combination comprising: extensions on said key levers and displaceable with the latter to respective determinable positions, a U-shaped bracket, means pivotally supporting said bracket so that engagement can be made with an extension which is displaced to the corresponding determinable position, said extensions having surfaces inclined relative to said bracket and said bracket having a movement vector such that engagement of an extension by said bracket displaces said extension and the associated key lever and therefore the associated shutter, a bracket stop, a spring engaging said bracket and urging the same to inactive position against said stop, a solenoid engaging said bracket to displace the same to an active position for engaging extensions in said determinable positions, a further photoelectric cell operatively disposed relative to said light source and adapted for being isolated therefrom by said shutters, a one-shot multivibrator coupled to and actuated by said further photoelectric cell upon isolation of the latter from said light source, said one-shot multivibrator being coupled to and actuating said solenoid whereby said bracket is actuated, gating means adapted, upon being conditioned, for coupling the first said photoelectric cells to said recording means for controlling the latter, an auxiliary photoelectric cell, an auxiliary light source operatively associated with said auxiliary cell, said auxiliary cell being connected to said gating means for conditioning the same, and an auxiliary shutter adapted to isolate said auxiliary cell and source for conditioning said gating means, the latter said shutter being connected to and actuated by said solenoid with said bracket in engagement with one of said extensions.

References Cited in the file of this patent

UNITED STATES PATENTS

| | | |
|---|---|---|
| 2,077,391 | Bryce | July 9, 1935 |
| 2,637,398 | Watson et al. | May 5, 1953 |
| 2,876,650 | Sangster | Mar. 10, 1959 |
| 2,901,042 | Blodgett | Aug. 25, 1959 |
| 2,938,666 | Rand | May 31, 1960 |
| 3,032,163 | Flieg | May 1, 1962 |